United States Patent
Wiley et al.

(10) Patent No.: US 12,291,473 B2
(45) Date of Patent: May 6, 2025

(54) WASTEWATER TREATMENT SYSTEM FOR IMPROVED PRIMARY TREATMENT AND VOLATILE FATTY ACID GENERATION

(71) Applicant: Inspired Water Technology Inc.

(72) Inventors: Robert Wiley, Pittsburgh, PA (US); Donato Massignani, Vicenza (IT)

(73) Assignee: Inspired Water Technology Inc., Brooklyn, NY (US)

(*) Notice: Subject to any disclaimer, the term of this patent is extended or adjusted under 35 U.S.C. 154(b) by 393 days.

(21) Appl. No.: 17/855,776

(22) Filed: Jun. 30, 2022

(65) Prior Publication Data

US 2023/0002264 A1 Jan. 5, 2023

Related U.S. Application Data

(60) Provisional application No. 63/218,460, filed on Jul. 5, 2021.

(51) Int. Cl.
| | |
|---|---|
| *C02F 9/00* | (2023.01) |
| *C02F 1/00* | (2023.01) |
| *C02F 1/463* | (2023.01) |
| *C02F 3/28* | (2023.01) |
| *C02F 3/30* | (2023.01) |
| *C02F 101/10* | (2006.01) |

(Continued)

(52) U.S. Cl.
CPC ............... *C02F 9/00* (2013.01); *C02F 1/004* (2013.01); *C02F 1/463* (2013.01); *C02F 3/288* (2013.01); *C02F 3/30* (2013.01); *C02F 2101/105* (2013.01); *C02F 2101/20* (2013.01); *C02F 2101/30* (2013.01); *C02F 2301/043* (2013.01)

(58) Field of Classification Search
None
See application file for complete search history.

(56) References Cited

U.S. PATENT DOCUMENTS

| | | |
|---|---|---|
| 4,454,038 A | 6/1984 | Shimodaira et al. |
| 4,568,464 A | 2/1986 | Blay et al. |
| 4,676,907 A | 6/1987 | Harrison |

(Continued)

FOREIGN PATENT DOCUMENTS

| | | |
|---|---|---|
| CN | 110371945 A | 10/2019 |
| CN | 111974353 A | 11/2020 |

(Continued)

OTHER PUBLICATIONS

Tong et al., "Enhanced Biological Phosphorus Removal Driven by Short-Chain Fatty Acids Produced from Waste Activated Sludge Alkaline Fermentation," Environ. Sci. Technol., 2007,41, 7126-7130 (Year: 2007).*

(Continued)

*Primary Examiner* — Chester T Barry
(74) *Attorney, Agent, or Firm* — Lang Patent Law LLC; William F. Lang, IV

(57) ABSTRACT

A water treatment system filters out solid material containing carbon, and provides that solid material to a fermenter. Volatile fatty acids are produced within the fermenter. After fermentation, a second filtering operation is utilized to permit passage of water and volatile fatty acids while filtering out solids from the fermenter. The volatile fatty acids are used as a food source for bacteria during secondary treatment of the water.

5 Claims, 7 Drawing Sheets

(51) Int. Cl.
  *C02F 101/20* (2006.01)
  *C02F 101/30* (2006.01)

(56) References Cited

U.S. PATENT DOCUMENTS

| | | | |
|---|---|---|---|
| 5,087,358 | A | 2/1992 | Massignani |
| 6,500,331 | B2 | 12/2002 | Massignani |
| 7,481,934 | B2 | 1/2009 | Skillicorn |
| 9,187,347 | B2* | 11/2015 | Van Vliet ............... C02F 1/465 |
| 9,808,747 | B2 | 11/2017 | Massignani |
| 10,280,099 | B2 | 5/2019 | Sorensen et al. |
| 10,351,455 | B2 | 7/2019 | Moller et al. |
| 10,689,273 | B2 | 6/2020 | Wiley, III |
| 10,881,989 | B2 | 1/2021 | Berkebile et al. |
| 10,881,990 | B2 | 1/2021 | Geibel et al. |
| 2005/0000905 | A1 | 1/2005 | Fields |
| 2006/0124541 | A1* | 6/2006 | Logan ............... C02F 11/121 |
| | | | 210/605 |
| 2007/0284294 | A1 | 12/2007 | Jackson |
| 2010/0051542 | A1* | 3/2010 | Elektorowicz ......... C02F 3/005 |
| | | | 204/627 |
| 2010/0133158 | A1 | 6/2010 | Zhu et al. |
| 2010/0236931 | A1* | 9/2010 | Fernando ............. B01D 21/26 |
| | | | 204/553 |
| 2011/0089106 | A1 | 4/2011 | Arbel et al. |
| 2011/0147304 | A1 | 6/2011 | Sauvignet et al. |
| 2015/0001094 | A1* | 1/2015 | Ibeid .................. C02F 3/301 |
| | | | 205/744 |
| 2015/0164108 | A1* | 6/2015 | Logan .................. A23K 10/12 |
| | | | 435/71.1 |
| 2015/0321937 | A1 | 11/2015 | Zhao et al. |
| 2015/0336827 | A1 | 11/2015 | Boltz et al. |
| 2016/0264444 | A1* | 9/2016 | Zuback ................ C02F 9/00 |
| 2017/0152168 | A1* | 6/2017 | Cloete ................ C02F 3/1289 |
| 2019/0055147 | A1 | 2/2019 | Boltz et al. |
| 2021/0129408 | A1 | 5/2021 | Quan et al. |
| 2021/0188675 | A1 | 6/2021 | Murat Hocaoglu et al. |
| 2022/0227652 | A1* | 7/2022 | Blaney ................ C02F 1/5281 |
| 2022/0340463 | A1 | 10/2022 | Lawrence |
| 2023/0192517 | A1* | 6/2023 | Hansen ................ C02F 3/006 |
| | | | 210/96.1 |

FOREIGN PATENT DOCUMENTS

| | | |
|---|---|---|
| CN | 113426408 B | 7/2022 |
| EP | 0388709 | 9/1990 |
| EP | 1129757 | 10/2005 |
| WO | 2015077484 A1 | 5/2015 |

OTHER PUBLICATIONS

Yuan et al., "Improved Bioproduction of Short-Chain Fatty Acids (SCFAs) from Excess Sludge under Alkaline Conditions," Environ. Sci. Technol., 2006,40, 2025-2029 (Year: 2006).*

Bahreini, Gholanreza, "Enhanced Primary Sludge Formation and Anaerobic Digestion for Integrated Carbon Upgrade and Resource Recovery" (Feb. 1, 2021) Electronic Thesis and Dissertation Repository, 7651, https://ir.lib.uwo.ca/cgi/viewcontent.cgi?article=10228&context=etd.

International Search Report and Written Opinion, Oct. 5, 2022.

A. Bhargava, Activated Sludge Treatment Process—Concept and System Design, International Journal of Engineering Development and Research, vol. 4, Issue 2, pp. 891-896, 2016.

J. B. van Lier et al., Biological Wastewater Treatment: Principles, Modeling, and Design, ch. 16, pp. 401-442, 2008.

Electrocoagulation, Wikipedia, dated at least as early as May 20, 2021, https://en.wikipedia.org/wiki/Electrocoagulation.

Working Princile and Constructure of Fermentation Tank, Yushunxin Fertilizer Manufactiring Equipment, dated at least as early as May 21, 2021, https://organicfertilizerplants.

S. G. Lu et al., Fermentation Wastewater Treatment in a Membrane Bioreactor, Environmental Technology, vol. 20, Issue 4, pp. 431-436, May 11, 2010, https://www.tandfonline.com.

Role of Microorganisms in Wastewater Treatment, AOS Treatment Solutions, Jul. 23, 2018, https://aosts.com/role-microbes-microorganisms-used-wastewater-sewage-treatment/.

A. Kurniawan et al., Acid Fermentation Process Combined with Post Denitrification for the Treatment of Primary Sludge and Wastewater with High Strength Nitrate, Mar. 24, 2016.

What is Electrocoagulation (EC)? Watertectonics, dated at least as early as May 20, 2021, https://www.watertectonics.com/electrocoagulation/.

Aerobic Treatment System, Wikipedia, https://en.wikipedia.org/wiki/Aerobic_treatment_system, dated at least as early as Aug. 9, 2022.

Ghizlane Enaime et al., Biochar for Wastewater Treatment—Conversion Technologies and Applications, Applied Sciences, May 18, 2020.

Su He et al. Biochar carrier application for nitrogen removal of domestic WWTPs in winter: challenges and opportunities, Applied Microbiology and Biotechnology, Sep. 14, 2018, https://doi.org/10.1007/s00253-018-9317-6.

Tyler M. Huggins et al., Granular biochar compared with activated carbon for wastewater treatment and resource recovery, US Nave Research, 2016, https://digitalcommons.unl.edu/usnavyresearch/99/?utm_source=digitalcommons.unl.edu%2Fusnavyresearch%2F99&utm_medium=PDF&utm_campaign=PDFCoverPages.

Lenno van den Berg et al., Heterogeneous diffusion in aerobic granular sludge, Wiley Biotechnology Bioengineering, Jul. 23, 2020.

Lignocellulosic Biomass, Wikipedia, dated at least as early as Jul. 22, 2022, https://en.wikipedia.org/wiki/Lignocellulosic_biomass.

Moving Bed Bioreactors (MBBR), Sustainable Water, 2018, https://sustainablewater.com/mbbr/.

International Search Report for PCT/US2023/035833 Dec. 29, 2023.

Written Opinion or PCT/US2023/035833 Dec. 29, 2023.

* cited by examiner

WASTEWATER TREATMENT SYSTEM FOR IMPROVED PRIMARY TREATMENT AND VOLATILE FATTY ACID GENERATION

CROSS REFERENCE TO RELATED APPLICATION

This application claims the benefit of U.S. provisional patent application Ser. No. 63/218,460, which was filed on Jul. 5, 2021, and entitled "Wastewater Treatment System."

TECHNICAL FIELD

The present invention is directed to the treatment of municipal or industrial wastewater. More particularly, a system for microfiltration of wastewater that also provides a readily available carbon source for bacteria which can be utilized in additional treatment steps is provided.

BACKGROUND INFORMATION

Treatment of wastewater for discharge or reuse has a long history. Many wastewater treatment plants utilize large tanks for incoming wastewater. Within these tanks, heavy particles sink to the bottom. This process is referred to in the industry as Primary Clarification or Primary Treatment. If increased biological nutrient removal is desired in the downstream processes, then the sludge that forms on the bottom of the tank is typically conveyed to a fermenter, or conditions in the tank are maintained to promote fermentation in situ, but this often leads to inefficiency in the fermentation process. The fermentation process produces volatile fatty acids such as acetic acid, propionic acid, and butyric acid, as well as hydrogen gas which could be recovered. Separation of these volatile fatty acids from the other solid material is desirable for use as a carbon source for bacteria utilized in other treatment processes. Examples of presently available devices and methods are described below. The entire disclosure of each and every patent described below is expressly incorporated herein by reference.

As an alternative to a large settling tank, incoming wastewater can be filtered. For example, EP 0388709, which was invented by Donato Massignani and published on Sep. 26, 1990, discloses a filtering machine for fibrous substances. The machine includes an inlet pipe leading to a delivery chamber having a parallelepiped shape. A raceway leads the water into a chamber. The chamber includes a cylindrical bottom. A pair of filtering elements are housed within the chamber. Each filtering element has a shape of a truncated cone. The filtering structure essentially forms a large wheel, which rotates on a shaft. The filtered water is discharged through two slits, which are disposed outside of the filters, into a tank. The tank is connected by the drainage pipe to the downstream installation for the recovery or disposal of the treated water. The taper of the filtering elements, which in the illustrated example is approximately 11°, combined with the mass of fibrous particles building up between the filters, results in a self-cleaning effect of the filters. With a mass of particles between the filters reaches approximately the midline, they are discharged through a discharge chute. Essentially the same invention is disclosed in U.S. Pat. No. 5,087,358, which was issued to Donato Massignani on Feb. 11, 1992.

U.S. Pat. No. 6,500,331, which was issued to Donato Massignani on Dec. 31, 2002, discloses a machine for micro filtering solid particles suspended in a liquid stream. The filtering apparatus is similar to that described in U.S. Pat. No. 5,087,358 and EP 0388709, but includes a washing chamber. The portions of the filter disks emerging from the treatment chamber are washed using strong jets from the washing ramps to remove the filtered impurities from the holes of the filtering surfaces of the disks. This machine also includes gaskets on the circumference of the disks, sealing the disks against the curved bottom plate so that all water is filtered without loss of hydraulic seal between the disks and the bottom plate. A similar invention is disclosed in EP 1129757, which was granted to Donato Massignani on Oct. 12, 2005.

Within both of the above devices, the velocity of the filter rotation, combined with the velocity of the water entering the chamber, results in smaller effective filter openings than the same openings in a stationary filter. The principal of "dynamic tangential filtration" results in a decrease in the effective flow passage section of the mesh with increasing rotation speed, permitting the mesh to block particles which are smaller than the individual mesh apertures. Additionally, as solid particles are blocked, a precoat is formed on the filter, further increasing filtration. Both of the above-described filtration systems are used for primary filtration of wastewater, either as the sole filtering step or prior to secondary and possibly tertiary treatment.

For tertiary treatment, which typically occurs after primary filtering and treatment with bacteria, filtration of smaller particles is desired. U.S. Pat. No. 9,808,747, which was issued to Donato Massignani on Nov. 7, 2017, discloses a machine for continuous micro filtration of wastewater. This machine is similar to those described above. The machine includes a base container having a conduit for liquid to be filtered, and a recirculation conduit which is utilized when liquid level exceeds a predetermined height. The filtering chamber includes a pair of disks and a partially cylindrical bottom wall. The disks are flat and parallel to the direction of fluid flow. The disks include lip seals in sliding contact with the bottom wall of the chamber. The disks are rotated by a motor so that the surface of the disks is moving in the opposite direction as the liquid to be filtered. An effluent chamber for receiving filtered liquid is located downstream from the filter discs. In the illustrated example, the effluent chamber includes two lateral portions, with each being delimited by the outer surface of a respective disc. They are joined together downstream to form a single chamber. A discharge conduit carries the liquid towards its next destination. A first and second jet washing means each include pipes connected to a manifold. Each of the manifolds is fed with pressurized washing fluid. A collecting duct is associated with each of the washing means for collecting removed solid particles. The filter mesh is made from stainless steel, has an effective filtering efficiency of 10 µm, and has a minimum tension of at least 20 N/cm. A drain hole is provided on the bottom wall of the treatment chamber so that sludge can be discharged. The level difference between the treatment chamber and effluent chamber is similar to prior devices, but the level in the treatment chamber is closer to the rotational axis of the discs, resulting in a larger filtering surface area. An overpressure in the treatment chamber operates as a fluid piston on the liquid to be filtered.

All of the above-described filtration systems are useful components of a wastewater treatment system. Presently, these filtration systems are utilized to remove a variety of particulate matter from incoming wastewater. However, other treatment processes are in need of improvement. For example, much of the incoming particulate matter is organic in nature, including cellulose fiber from toilet paper and organic particulate or fiber from human waste, as well as other solids within the flow of water. It is currently known to utilize the cellulose and other organic materials for a fermentation process to provide volatile fatty acids as a food source for feeding bacteria utilized in downstream treatment processes, but there is a need to provide a higher concentration of organic material to a fermenter in order to reduce the volume of material to be fermented. Increasing the concentration of cellulose and other organic solids enables the use of smaller fermenting tanks, as well as facilitating optimization of the fermentation process through greater control of the amount of water which is present, or which is used as eluent.

Once the volatile fatty acids have been generated by the fermentation process, these acids must be separated from the other solids so that they can be introduced as a readily assimilable carbon source without reintroducing unwanted suspended solids. Thus, there is a need to provide the volatile fatty acids to water undergoing treatment with bacteria without reintroducing undesired contaminants into the water.

SUMMARY

The above needs are met by a method for treating water. A first filter apparatus is provided. Incoming water is provided to the first filter apparatus. The incoming water is filtered to remove solids from the incoming water to produce filtered water, with the portion of the incoming water which remains unfiltered water remaining with the solids. The solids and a portion of the unfiltered water are placed in a fermentation tank. The solids are fermented within the portion of the unfiltered water to produce water containing the solids and volatile fatty acids. The water containing the solids and volatile fatty acids is filtered to remove the solids to produce water containing volatile fatty acids.

These and other aspects of the invention will become more apparent through the following description and drawings.

BRIEF DESCRIPTION OF THE DRAWINGS

Like reference characters denote like elements throughout the drawings.

DETAILED DESCRIPTION

Figure 1:
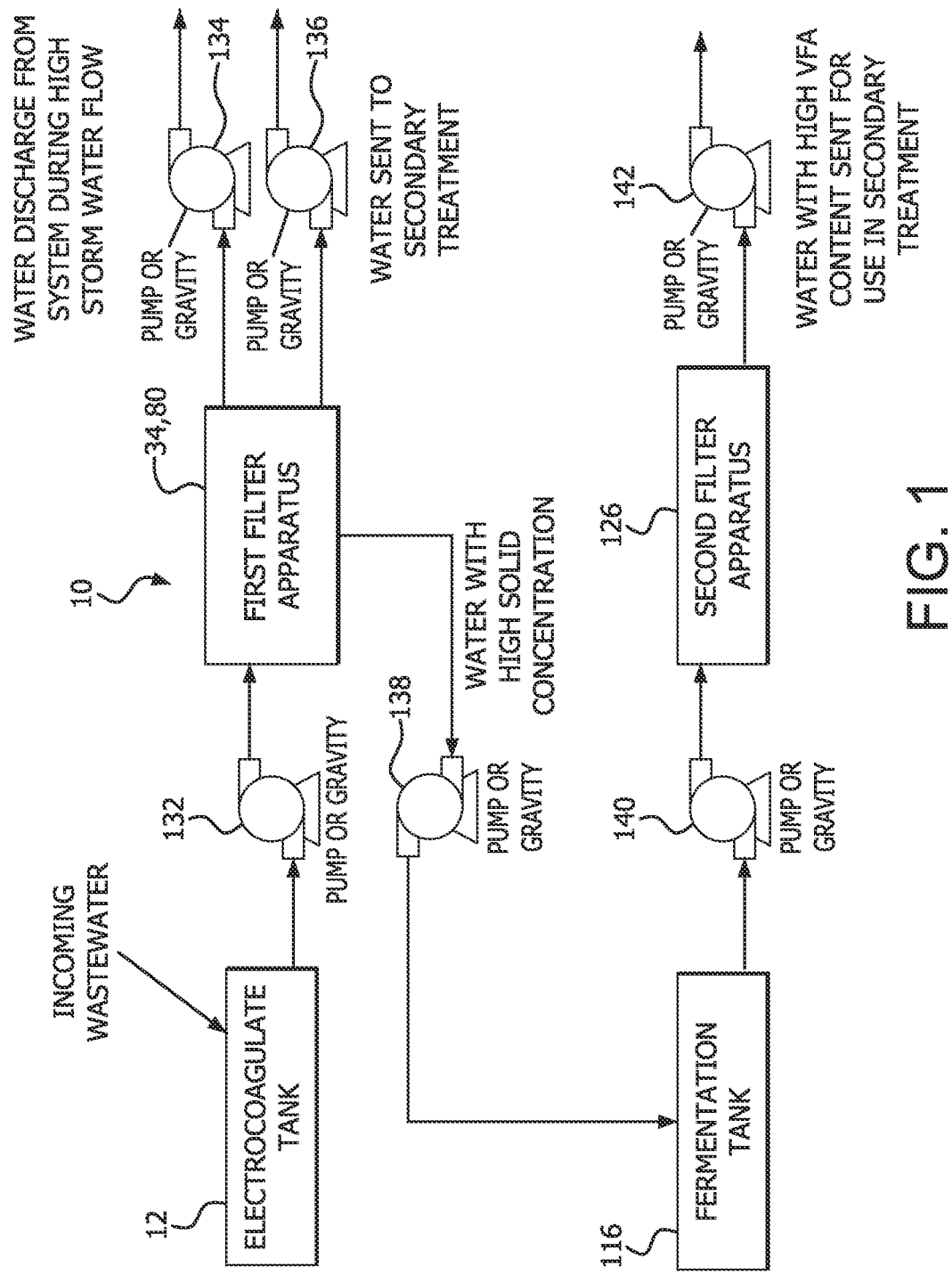
FIG. 1 is a schematic overview of a wastewater treatment system.
Figure 2:
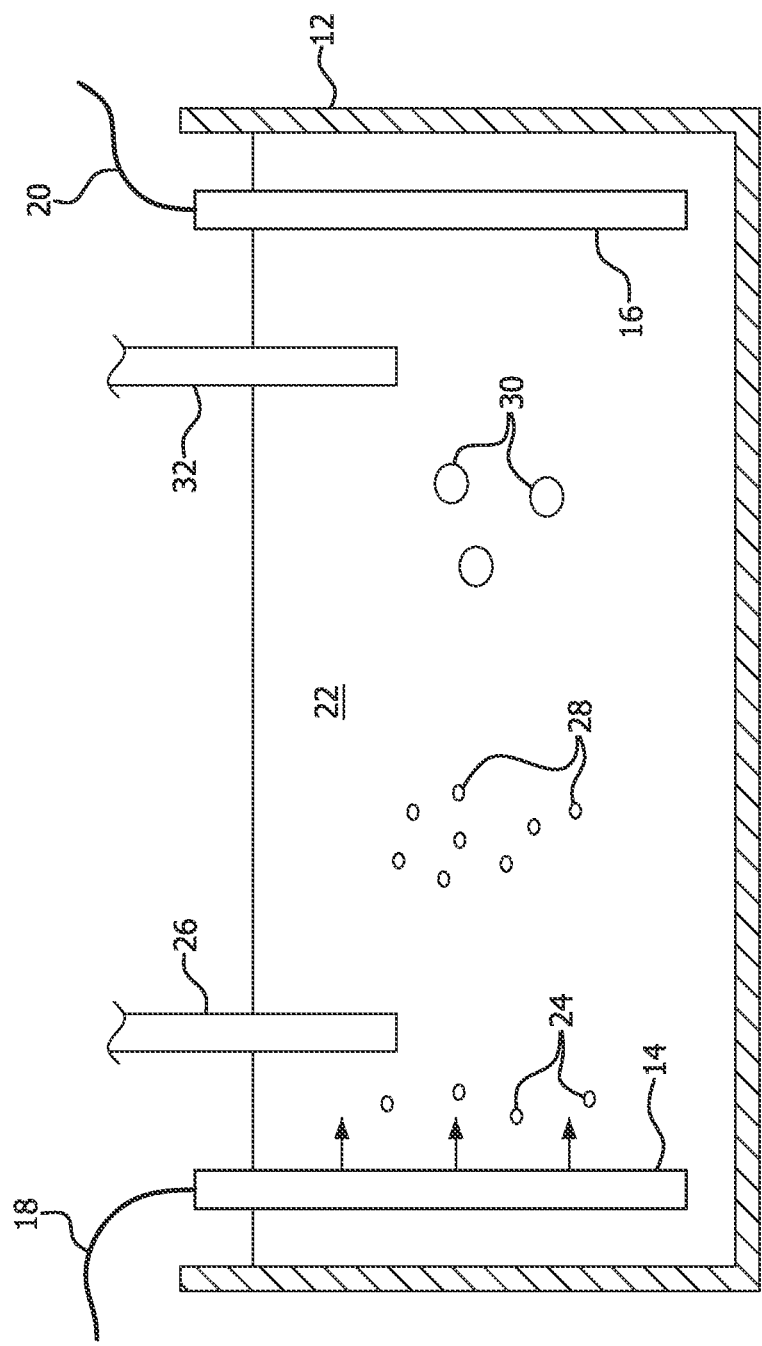
FIG. 2 is a partially schematic side elevational view of an electrocoagulation tank for the wastewater treatment system of FIG. 1.
Figure 5:
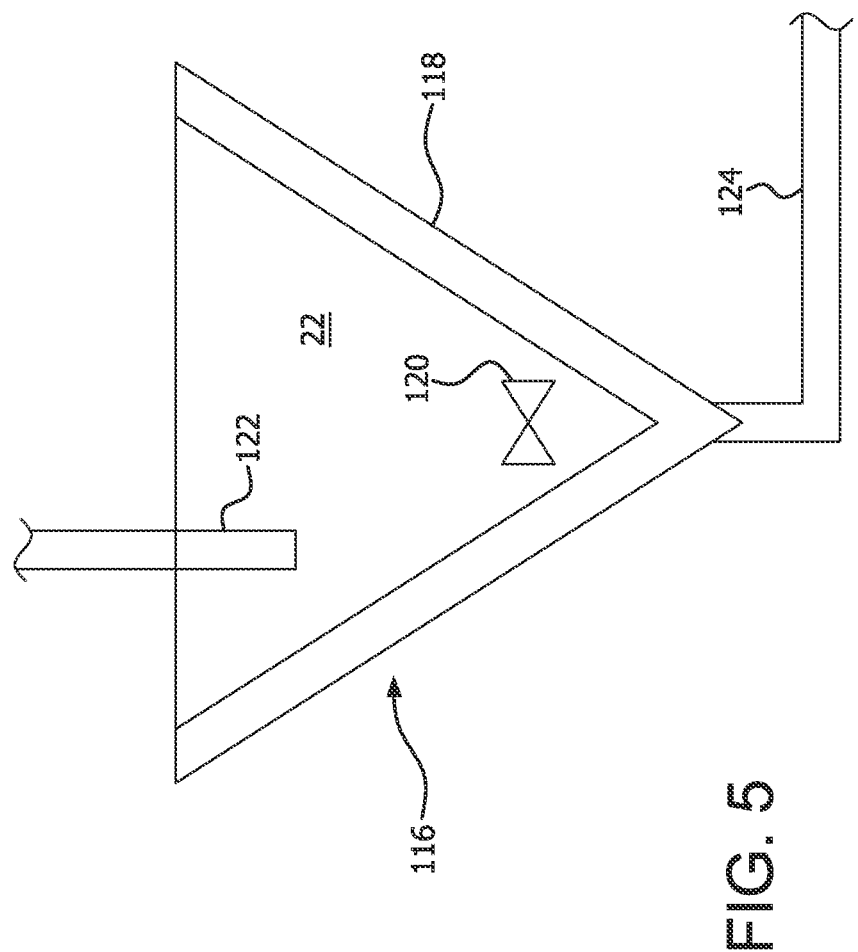
FIG. 5 is a partially schematic side elevational view of a fermentation tank for use with the wastewater treatment system of FIG. 1.
Figure 6:
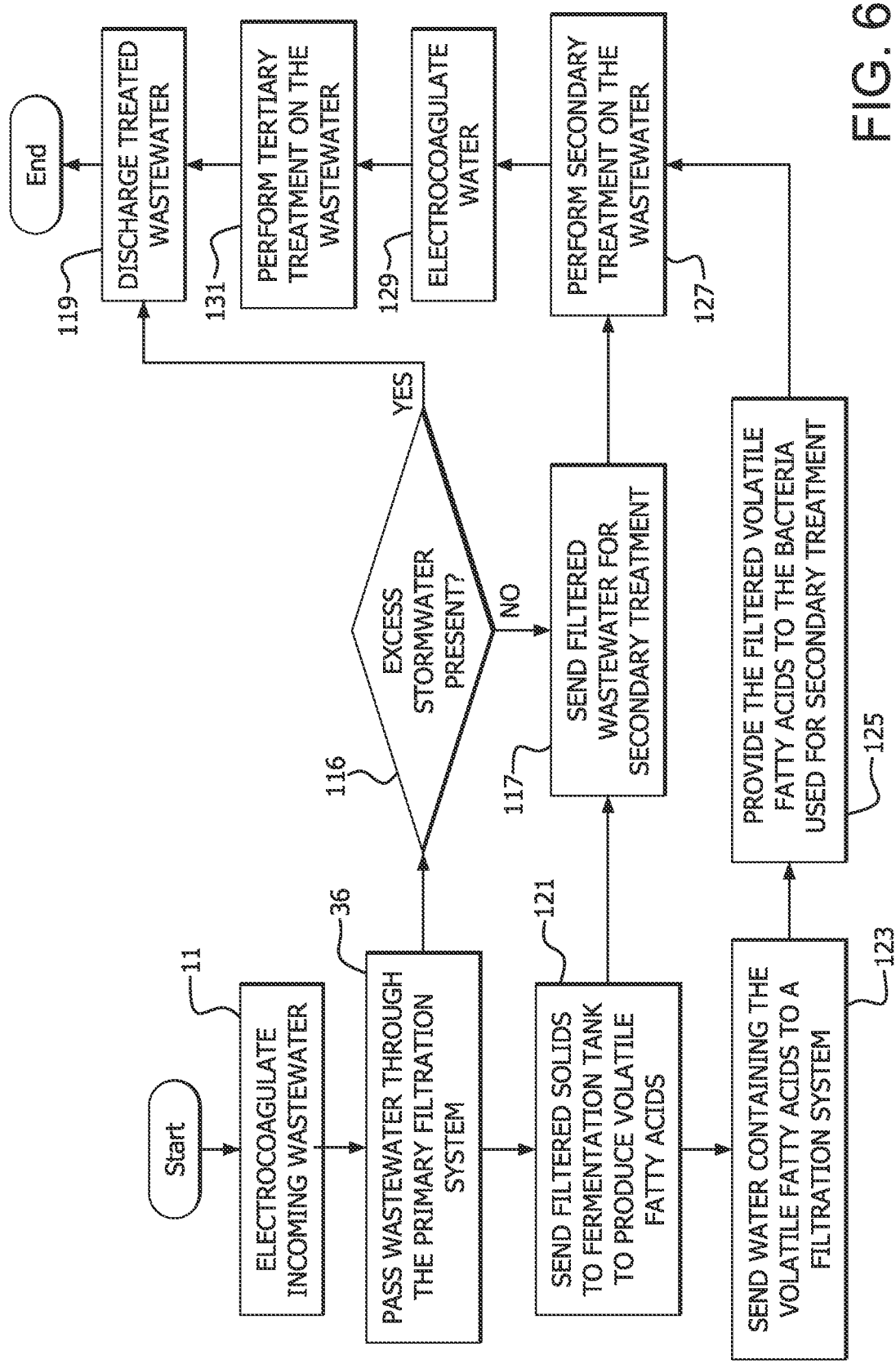
FIG. 6 is a flowchart illustrating the process steps for wastewater treatment utilizing the system of FIG. 1.
Figure 7:
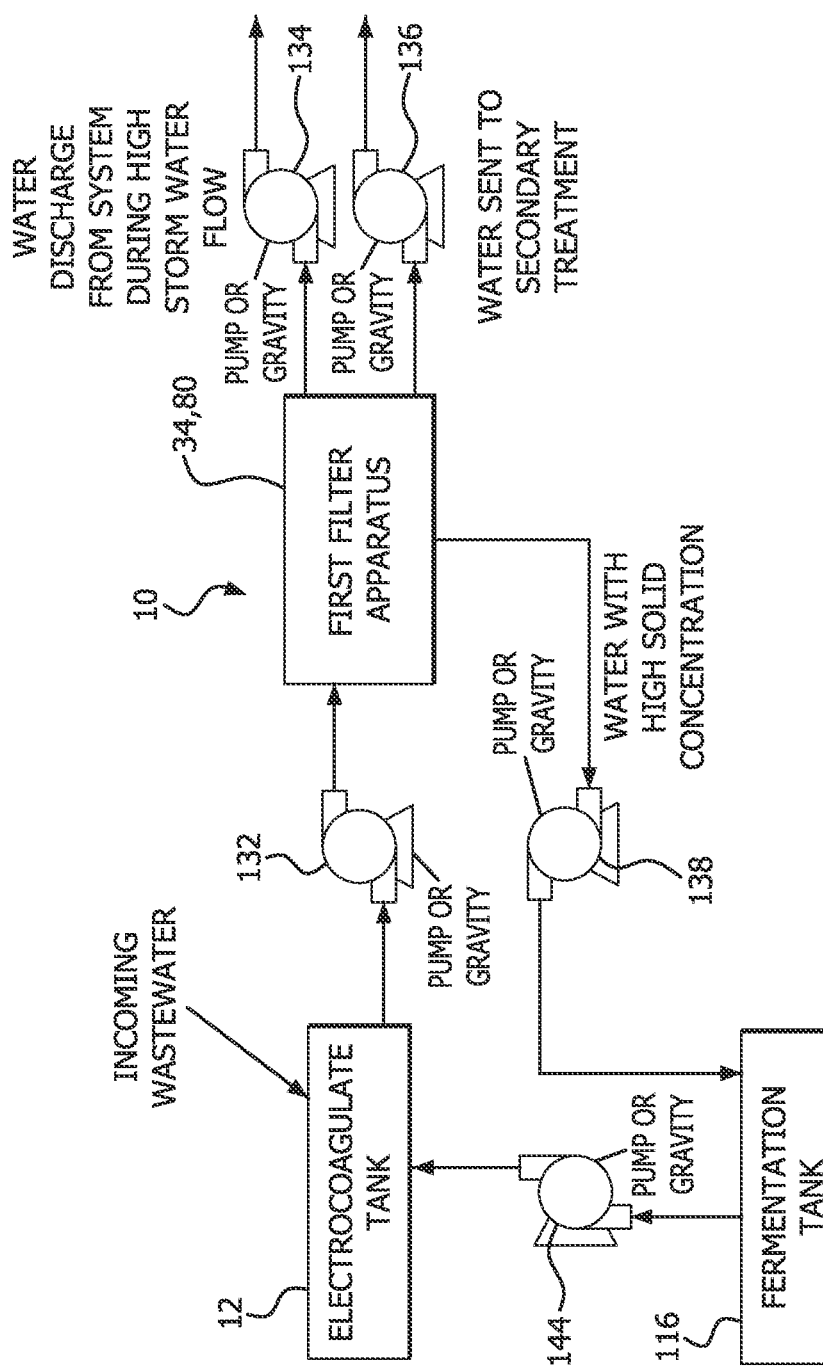
FIG. 7 is a schematic overview of another wastewater treatment system.

Referring to the drawings, a system for treating wastewater is illustrated. FIGS. 1 and 7 illustrate examples of the overall components of the system 10. FIGS. 2-5 illustrate examples of individual components of the system. FIG. 6 illustrates an example of a process which can be followed using the system. The purpose of the system is to provide a more efficient and effective system for mechanically filtering the wastewater, utilizing the cellulose and other organics filtered from the water to produce volatile fatty acids, and then removing solids from the water containing the volatile fatty acids. These volatile fatty acids can then be used as a readily assimilable carbon source for bacteria which is utilized in downstream treatment processes without reintroducing undesired solids into the water being treated.

Referring to FIGS. 1, 2, 6, and 7, some examples of the process begin by subjecting the incoming wastewater to an electrocoagulation process shown at step 11 in FIG. 6. Electrocoagulation is known to those skilled in the art, and is only described briefly herein. The electrocoagulation tank 12 (FIG. 2) includes a pair of aluminum or iron plates 14, 16, with the plate 14 forming the anode, and the plate 16 forming the cathode. Electrical connections 18, 20, are connected to plates 14, 16, respectively to provide the appropriate charge. Applying an electrical charge to the plates 14, 16 causes the anode 14 to corrode, releasing ions 24 into the wastewater 22. As wastewater 22 enters the tank through inlet 26, the electrical charge causes small dissolved solid particles 28 within the wastewater to coagulate together, forming larger particles 30, improving filtration efficiency. Without being bound by any particular theory, the coagulation of small particles 28 into larger particles 30 can occur through different mechanisms. In some examples, the metal ions may act as seeds for the formation of larger particles. In other examples, charges on the surfaces of small particles 28 are neutralized, minimizing repulsive charges that would otherwise prevent small particles 28 from coagulating, in part due to water 22 at the cathode 16 being hydrolyzed into hydrogen gas and hydroxyl groups. Any particulate phosphorous within the wastewater is likely to be coagulated along with particles of other material, thus making it more likely that the phosphorous is retained by the filters during the filtering step described below, and the electrocoagulation process also will convert a portion of the dissolved phosphorous present into particulate form and help to keep bound in the fermentation waste. Phosphorous removal from municipal wastewater is of great concern as its discharge to the environment can lead to algal blooms in the receiving water and eventually eutrophication when these algal cells die in mass, which can lead to oxygen depletion of the water consequently killing aquatic life. Lead, copper, zinc, or other metals of concern will also tend to be coagulated, facilitating their removal, reducing their discharge into the receiving body of water. The wastewater 22 exiting through the outlet 32 thus contains particles of solids which are significantly easier to remove in subsequent steps.

Some examples of the electrocoagulation tank 12 may include a power supply for the electrical connection to the plates 14,16 which is operatively connected to a microcontroller. The microcontroller is connected to downstream sensors for detection of various contaminants. Depending on the sensor readings provided to the microcontroller, the amount of electrical power supplied to the plates 14,16 can be increased or decreased to produce more optimized results.

Figure 3:
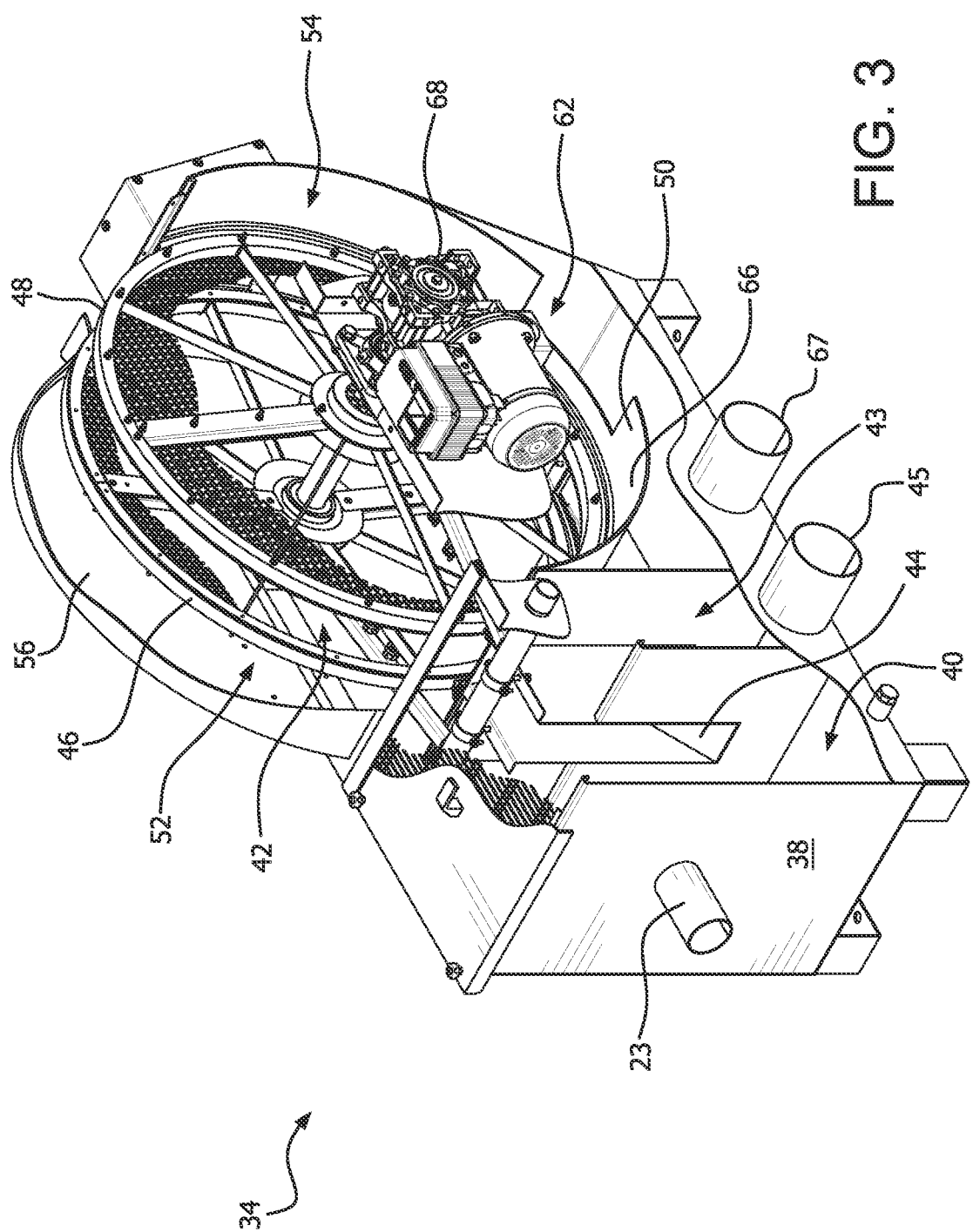
FIG. 3 is a perspective view of a filter apparatus for use with the wastewater treatment system of FIG. 1.

After electrocoagulation, or as a first step if electrocoagulation is not used, wastewater 22 flows into a filter apparatus 34, which is best illustrated in FIG. 3, and is step 36 in the flowchart of FIG. 6. Movement of the wastewater may be accomplished using a pump 132 or by gravity feed. One example of a filter apparatus 34 is described in U.S. Pat. No. 5,087,358, which was issued to Donato Massignani on Feb. 11, 1992, the entire disclosures of which is expressly incorporated herein by reference. Another example of a filter apparatus 34 is described in U.S. Pat. No. 6,500,331, which was issued to Donato Massignani on Dec. 31, 2002, the entire disclosures of which is expressly incorporated herein by reference.

Figure 4:
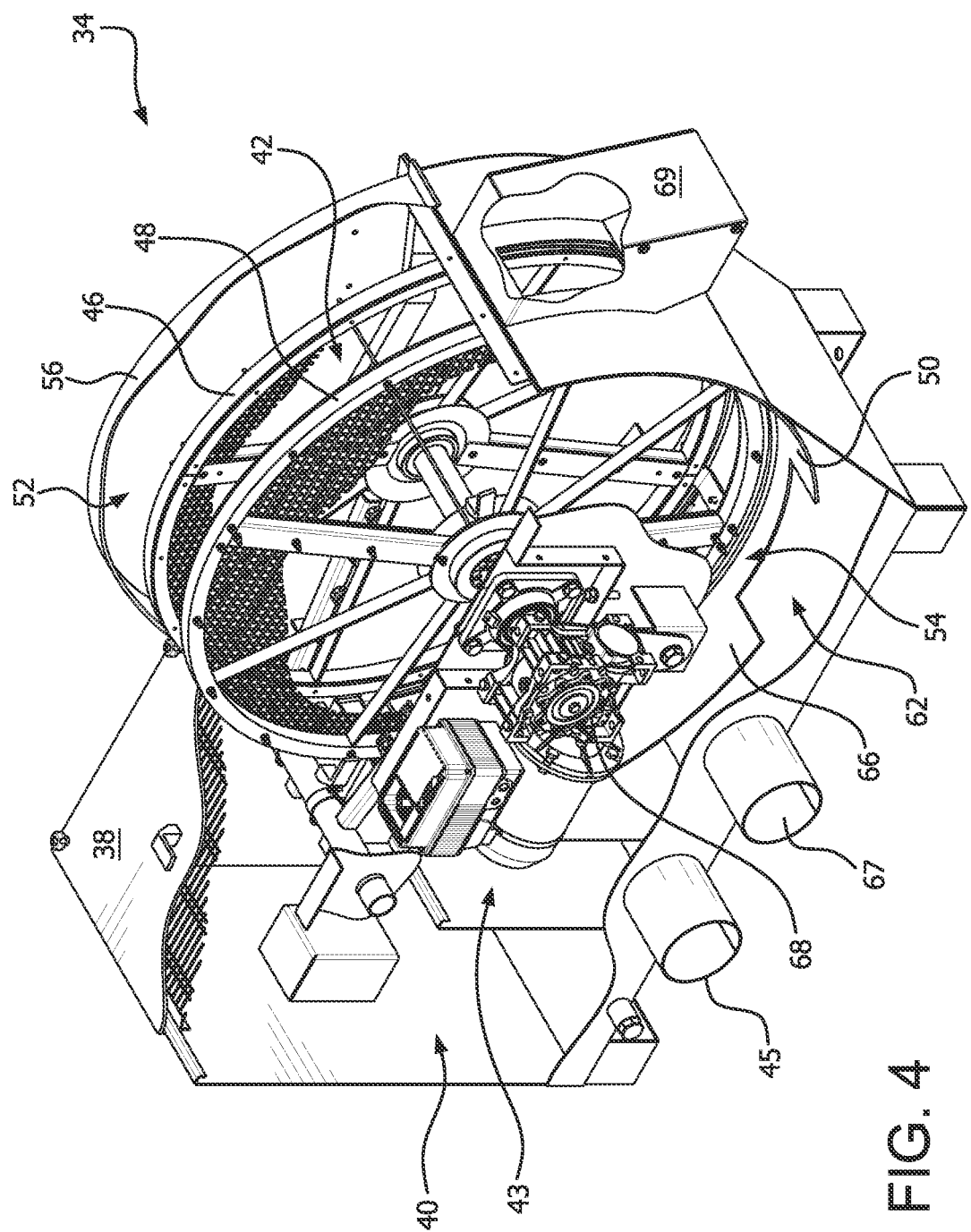
FIG. 4 is another perspective view of the filter apparatus of FIG. 3.

Yet another example of a filter apparatus 34 is illustrated in FIGS. 3-4. The illustrated example of the filter apparatus 34 includes a housing 38 which contains a feeding chamber 40 into which water is directed through inlet 23. The feeding chamber 40 is connected to a treatment chamber 42 by a feeding duct 44. An overflow chamber 43 catches any overflow from the feeding duct 44, so that this water can flow through the drain 45 and back into the inlet 23. The treatment chamber 42 is formed between a pair of opposing, rotatable disk-shaped filter disks 46,48 and a semi-cylindrical bottom wall 50 in sealing engagement with the filter disks 46,48. In the illustrated example, the pores within the filter disks 46,48 are sized to filter particles of about 200 microns to about 400 microns or greater, but finer mesh can be instituted depending on the desired removals and process conditions. Some examples of the mesh can have a filtration efficiency of 10 µm or greater. Conveying chambers 52,54 are disposed between the filter disks 46,48, respectively, and a side wall 56 (which are the same on both sides), of the housing 38. Discharge openings 62 (which are the same on both sides) are defined within the bottom 66 (same on both sides) of each conveying chamber 52,54 for permitting filtered water to flow out through the drain 67 towards its next destination.

Some examples of the filter disks 46,48 each have a frustum conical configuration which is concave facing the treatment chamber 42. Other examples of the filter disks may have a substantially planar configuration. A motor 68 rotates the disks 46,48 as water passes from the treatment chamber 42 through the disks 46,48 and into the conveying chambers 52,54. The rotation of the disks 46,48 permits the disks 46,48 to filter particles smaller than the size of the pores within the disks 46,48 due to dynamic tangential filtration. Once the mass of filtered material reaches about the midpoint of the disks 46,48, the filtered material will be discharged through the discharge chute 69.

Filtered water 22 exiting through the outlets 67 may be directed by pump 136 or gravity feed towards a secondary treatment station wherein bacteria is utilized to remove undesirable substances from the water 22. Alternatively, depending on local laws as well as the amount of water flowing into the system, at least some water may be directly discharged through pump 134 or gravity feed from the system during times of high volume such as after heavy rainstorms, with this decision being shown at steps 115, 117, and 119 in the flowchart of FIG. 6. The filtered solids which depart through the chute 69, along with whatever water remains with these filtered solids, is directed towards a fermenter 116, which is illustrated in FIG. 5 and shown at step 121 in FIG. 6, again either using a pump 138 or gravity feed. Although prior art processes typically produce about 0.5% to about 2% solids within the material removed by clarification, filtering or other processing, the present invention has been found to produce about 6% to about 12% solids within the material removed by the filter. This higher concentration of solids means that the size of the fermenter can potentially be reduced to as little as ⅓ of the size which would otherwise be required. This high concentration also provides greater control over the conditions under which fermentation takes place, permitting the addition of water for elution of the volatile fatty acids or adjustment of the liquid to solids ratio for the fermentation process if desired while still maintaining a high concentration of solids.

Fermenters are well known to those skilled in the art, and an example is therefore only briefly described herein. The illustrated example of a fermenter 116 is shown in FIG. 5. The fermenter 116 includes a housing 118 which in the illustrated example is conical. A stirring element is disposed within the housing 118. The illustrated example includes a mechanical stirrer, which in some examples may be a magnetic stirrer 120, although large gas bubbles or other stirring methods may be used. The filtered solids and accompanying water enter the housing 118 through the inlet 122. The fermenter can take many forms as various fermentation devices have been developed and are regularly utilized in practice, for example, continuously stirred tank bioreactors, fluidized bed fermenters, fixed bed fermenters, and various other designs. Thus, the illustrated example of a fermenter 116 represents only one such configuration which could be employed in this process.

A portion of the solid material within the wastewater 22 is anticipated to be toilet paper, providing a source of cellulose, and other organic solids from human or food waste. Within the environment of the fermenter 114, the cellulose and other organics will ferment on its own under anaerobic conditions via bacteria naturally present in the wastewater or specific strains inoculated into the fermenter to produce volatile fatty acids such as acetic acid, propionic acid, and butyric acid. Because of the density of the solids within the water as compared to prior art process, the amount of water can be more precisely controlled to provide optimal conditions for fermentation, adding water if desired in the form of an eluent to help flush volatile fatty acids from the fermenter. Glycerin or other organic material may be added to the fermenter 114 if desired in order to increase the carbon content, improving the yield of volatile fatty acids, or other readily available carbon rich waste-streams could be considered, including, for example, waste sludge from downstream processes. Glycerin is a byproduct of biodiesel production, providing an inexpensive source of biologically available carbon, or other organic containing material can be added.

After fermentation, water carrying both the fermentation products and remaining solid material exits through the outlet 124 to proceed towards a mechanical filter, which is shown at step 123 in the flowchart of FIG. 6. Movement of the wastewater may be accomplished using a pump 140 or by gravity feed. In the example of FIG. 1, that mechanical filter is a second filter apparatus 126 which is substantially identical to the filter apparatus 34 described above, with the possible exception of the pore size in the filter disks. Some examples of the filter apparatus 126 may use filter disks which filter particles having a size of about 300 microns to about 900 microns or greater depending on the filter mesh size applied to the disk surface. The resulting combination of water and volatile fatty acids can then be combined with the water 22 to be treated within a secondary treatment area, as shown at steps 125 and 127 in FIG. 6. The volatile fatty acids serve as a readily assimilable carbon source for the bacteria within the secondary biological treatment area, often referred to as simply as secondary treatment, facilitating the ability of these bacteria to perform their desired function.

In the example of FIG. 7, the output of the fermenter 114 can be redirected back into the filter 34 along with other incoming water to be treated. Movement of the wastewater may be accomplished using a pump 144 or by gravity feed. The filter 34 will therefore remove not only the solids from the incoming water, but also the solids from the water containing the volatile fatty acids from the fermentation process. The water sent downstream by the filter 34 will therefore already contain the volatile fatty acids which will be utilized as food by the bacteria used for secondary treatment.

After secondary treatment, an optional tertiary treatment may be performed. The water 22 may, if desired, be sent by a pump 142 or by gravity feed to another electrocoagulater 128 (step 129 in FIG. 6), which may be substantially identical to the electrocoagulater described above. The water 22 is then sent to another filter apparatus 130 to provide tertiary solids removal with an effective filtration efficiency of 10 micron or greater (step 131 in FIG. 6), for example, the filter apparatus described within U.S. Pat. No. 9,808,747, which was issued to Donato Massignani on Nov. 7, 2017, the entire disclosure of which is expressly incorporated herein by reference.

The present invention therefore provides a system for filtering carbon sources from wastewater, utilizing those carbon sources to produce volatile fatty acids through fermentation, and then filtering the fermentation products to resist reintroduction of undesired solids into the water undergoing treatment. The system provides for effective, efficient filtering which provides high-density sludge for fermenting. The high density sludge enables the use of smaller fermenters, as well as facilitating a high level of control of the fermentation process. The system further ensures that undesired solids are filtered out of the fermentation products, so that adding water containing the volatile fatty acids to the water undergoing secondary treatment does not reintroduce undesired elements. The addition of electrocoagulation to the process can also aid in the capture of the carbon particulate and precipitation of the dissolved carbon for feeding into the fermentation process, while also reducing the phosphorus levels to the downstream processes as well as potentially reducing metals of concern like lead, copper, and zinc. The system improves upon the efficiency and effectiveness of the prior art processes, while permitting the use of smaller equipment and also permitting greater control over the conditions under which treatment occurs.

A variety of modifications to the above-described embodiments will be apparent to those skilled in the art from this disclosure. Thus, the invention may be embodied in other specific forms without departing from the spirit or essential attributes thereof. The particular embodiments disclosed are meant to be illustrative only and not limiting as to the scope of the invention. The appended claims, rather than to the foregoing specification, should be referenced to indicate the scope of the invention.

What is claimed is:

1. A method for treating water, comprising:
providing a first filter apparatus;
providing unfiltered water to the first filter apparatus;
filtering the unfiltered water to remove solids from the unfiltered water to produce initial filtered water, with the unfiltered water remaining with the solids;
placing the solids and a portion of the unfiltered water in a fermentation tank;
fermenting the solids within the portion of the unfiltered water to produce water containing the solids and volatile fatty acids; and
filtering the water containing the solids and volatile fatty acids using the first filter apparatus to remove the solids to produce water containing volatile fatty acids simultaneously with filtering unfiltered water.

2. The method according to claim 1, further comprising:
providing a secondary biological treatment area wherein the initial filtered water and water containing volatile fatty acids are treated utilizing bacteria;
placing the initial filtered water and the water containing the volatile fatty acids within the secondary biological treatment area to expose the filtered water and the water containing the volatile fatty acids to the bacteria to produce secondarily treated water; and
utilizing the volatile fatty acids to feed the bacteria.

3. The method according to claim 2, further comprising:
providing a tertiary filter apparatus; and
filtering the secondarily treated water using the tertiary filter apparatus.

4. The method according to claim 1, further comprising treating the unfiltered water using electrocoagulation prior to filtering the unfiltered water to remove solids from the unfiltered water using the first filter apparatus.

5. The method according to claim 4, wherein the electrocoagulation precipitates or coagulates a portion of the dissolved or particulate organics, phosphorus, copper, zinc, or combinations thereof.

* * * * *